United States Patent [19]
Ritola

[11] Patent Number: 5,249,915
[45] Date of Patent: Oct. 5, 1993

[54] DUAL INDEPENDENT HOIST BREAKDOWN STATION

[75] Inventor: Edward W. Ritola, LaCenter, Wash.

[73] Assignee: U.S. Natural Resources, Inc., Vancouver, Wash.

[21] Appl. No.: 836,069

[22] Filed: Feb. 13, 1992

[51] Int. Cl.⁵ .............................................. B65G 59/02
[52] U.S. Cl. ............................... 414/796.7; 414/796.2; 414/924
[58] Field of Search ........ 414/796.2, 796.7, DIG. 924

[56] References Cited

U.S. PATENT DOCUMENTS

| | | | |
|---|---|---|---|
| 3,018,008 | 1/1962 | Eger et al. | 414/924 X |
| 4,640,655 | 2/1987 | Jacobsen | 414/796.7 X |
| 4,838,748 | 6/1989 | Johnson | 414/796.7 |

FOREIGN PATENT DOCUMENTS 223676 11/1968 Sweden .
545546 2/1977 U.S.S.R. .

*Primary Examiner*—Robert P. Olszewski
*Assistant Examiner*—Dean A. Reichard
*Attorney, Agent, or Firm*—Robert L. Harrington

[57] ABSTRACT

A dual independent hoist arrangement for a breakdown station is shown. The breakdown station includes an input conveyor depositing loads on an L-shaped tilting frame. The tilting frame pivots the load into a transport path whereat one of the two independently operable lifting hoists accepts the load directly from the tilting frame and moves the load along a transport path to a fixed discharge point. Load engaging forks of each lifting hoist move into and out of the load transport path for coordinated use and sequencing of the tilting frame and lifting hoists.

9 Claims, 5 Drawing Sheets

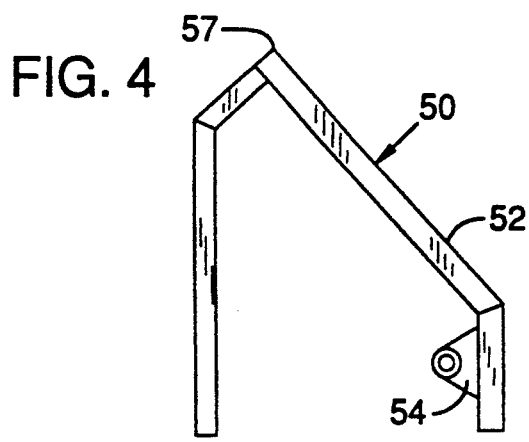
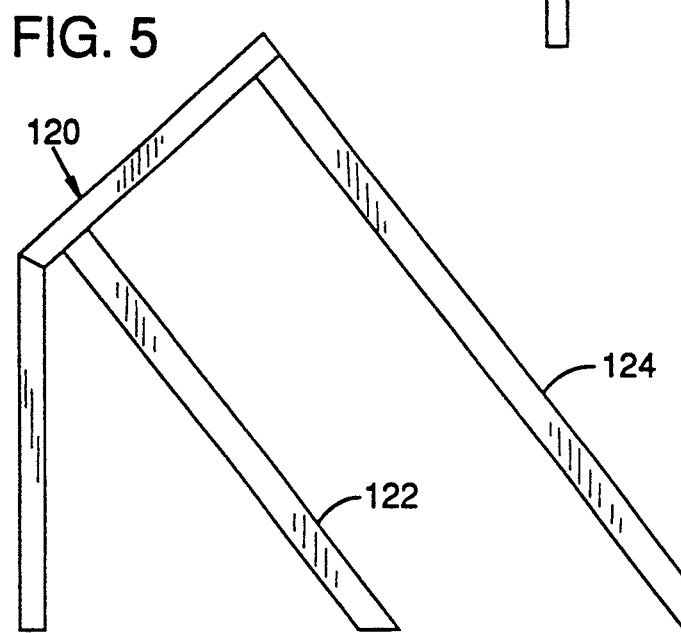
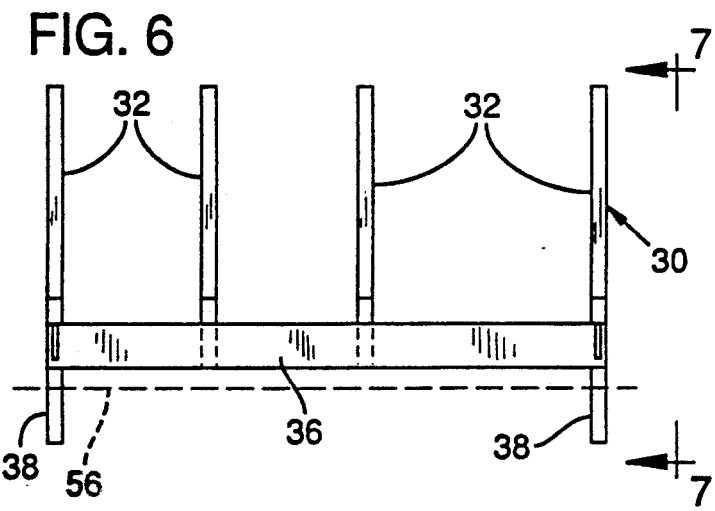
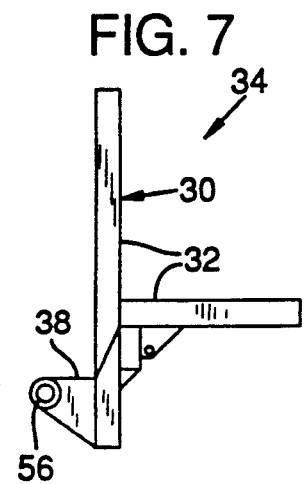

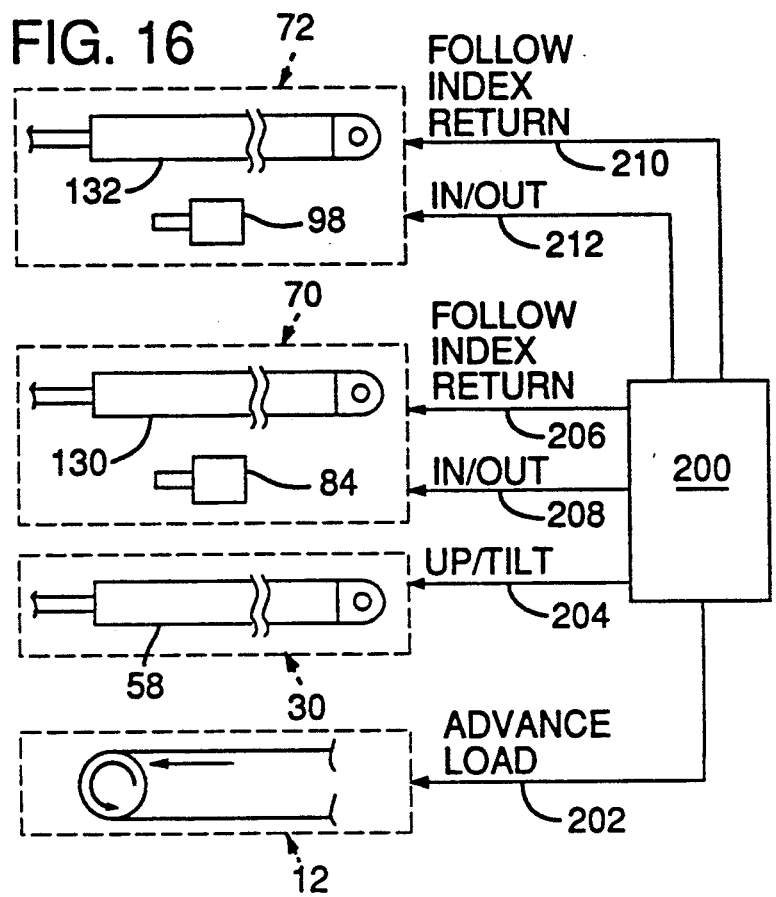
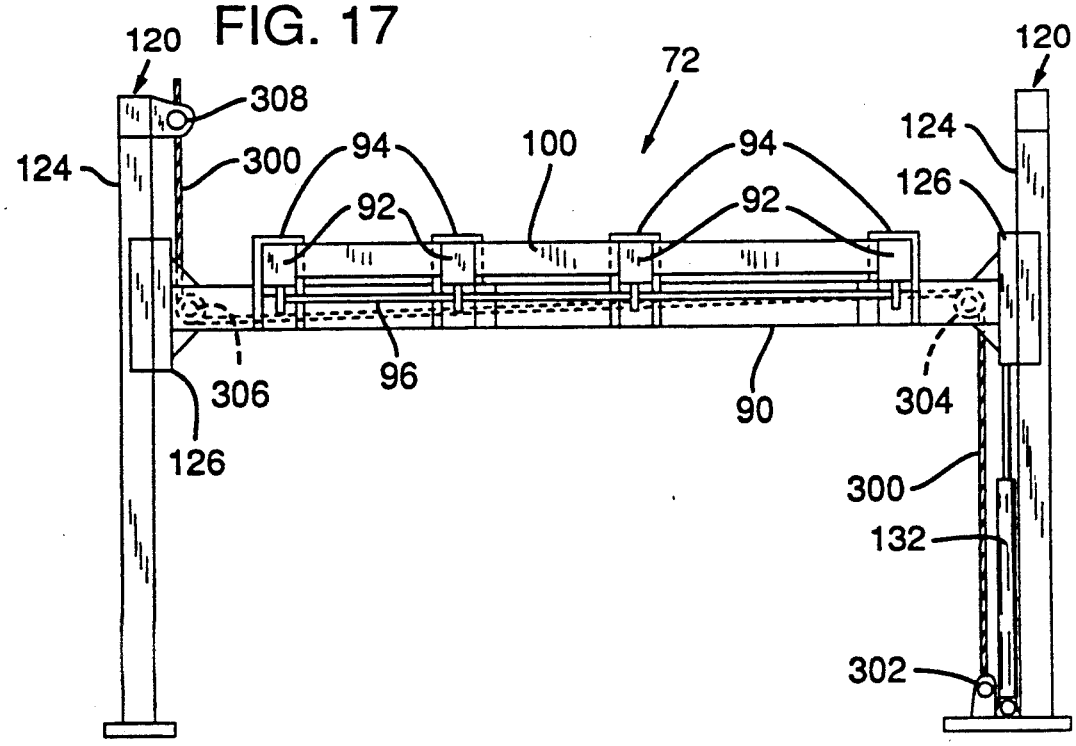

DUAL INDEPENDENT HOIST BREAKDOWN STATION

BACKGROUND OF THE INVENTION

A breakdown station receives a series of packages organized as tiered pieces and performs the task of breaking down the packages for substantially continuous delivery of the individual pieces. For example, a lumber breakdown station at the input to a planer mill receives tiered lumber packages and strips off the tiers top to bottom so that individual lumber pieces may be fed through the planer mill.

A breakdown station must be efficient in its manipulation of the package and delivery of individual pieces to the next processing station. The timing and sequencing of the breakdown process must be carefully considered and orchestrated to minimize any loss in output. The goal, generally, is to provide a continuous output of individual lumber pieces. This goal is frustrated by the need to continually introduce new packages into the breakdown station, suitably position these packages in preparation for breakdown, and manipulate the apparatus in order to efficiently discharge the packages as continuous single piece output.

U.S. Pat. No. 4,640,655 issued Feb. 3, 1987 to Marvin A. Jacobsen shows a Continuous Feeding Apparatus. In the Jacobsen disclosure, a pivotable hoist receives a tiered load and performs both the function of tilting the load onto an inclined ramp and advancing the load along the ramp toward an accumulator apparatus. The accumulator apparatus includes retractable forks, i.e., movable into and out of the load travel path, which accept a partially discharged load from the hoist. In operation, the pivotable hoist first accepts a load for breakdown and moves that load, i.e., by pivoting, into and along, i.e., by longitudinal movement parallel, to the travel path. In this manner, the pivotable hoist begins the process of breakdown. During the process of breakdown, the accumulator apparatus extends its forks behind the load and completes the discharge function partially completed by the pivotable hoist. Thus, in the Jacobsen apparatus the functions of tiltover and movement along a travel path are integrated, i.e., the pivotable hoist performs both the function of tiltover into a travel path and movement along the travel path to begin breakdown. The accumulator apparatus only completes the discharge operation by taking over the function of movement of the load along its travel path. In the Jacobsen apparatus, the point of discharge is a traveling point of discharge defined by the skid which moves at a controlled rate relative to the movement of the load. Tiers of the load fall from the load as the load advances along the travel path at a rate faster than the skids advance.

U.S. Pat. No. 4,838,748 issued Jun. 13, 1989 to Alan T. Johnson shows a Hoist and Accumulator Arm Apparatus. The Johnson disclosure shows an apparatus for continuously feeding individual elements of tiered loads. The Johnson apparatus has a pivotable hoist which receives tiered loads, pivots the loads into a load travel path, and begins advancing the loads along the travel path and toward a discharge point. An accumulator apparatus, also movable along the travel path, includes retractable forks, i.e., movable into and out of the travel path. The accumulator takes over the function of advancing the load along the travel path and completing the process of breakdown. Thus, the Johnson apparatus integrates the function of tilt back into a travel path and the function of load advance along the travel path.

The traditional breakdown station, i.e., preceding that of the Johnson and Jacobsen devices described above, includes a pivotable hoist for receiving loads and tilting the load into a feed path. The pivotable hoist also performs the complete breakdown process in advancing the load fully along the travel path to accomplish breakdown. Thus, in the traditional breakdown station the functions of tilt back and advance along the travel path are fully integrated. The load must be fully discharged before the pivoting hoist can return to accept the next load for discharge.

SUMMARY OF THE INVENTION

In accordance with the preferred embodiment of the present invention, a breakdown station includes a tilting member pivotable about a fixed pivot point and receiving lumber packages from an input conveyor. The tilting member pivots the packages into a package transport path. The station further includes at least one lifting hoist including package engaging elements movable into and out of the package transport path. The lifting hoist receives the package directly from the tilting member and moves the package fully along the transport path and past a fixed discharge point.

According to one aspect of the present invention, two such lifting hoists are provided and operated individually or in cooperation to further enhance the efficiency of the breakdown station.

The subject matter of the present invention is particularly pointed out and distinctly claimed in the concluding portion of this specification. However, both the organization and method of operation of the invention together with further advantages and objects thereof, may best be understood by reference to the following description taken with the accompanying drawings wherein like reference characters refer to like elements.

BRIEF DESCRIPTION OF THE DRAWINGS

For a better understanding of the invention, and to show how same may be carried into effect, reference will now be made, by way of example, to the accompanying drawings in which:

FIG. 4 illustrates one of several inner support frames for the breakdown apparatus of FIG. 1.

FIG. 5 illustrates one of two outer support frames of the breakdown apparatus of FIG. 1.

FIG. 6 illustrates a package receiving tilting frame for delivering packages to the hoist mechanism as taken generally along lines 6—6 of FIG. 1.

FIG. 7 is an end view of the tilting frame of FIG. 6 as taken generally along line 7—7 of FIG. 6.

FIG. 16 illustrates schematically a control arrangement for the dual independent hoist breakdown station of FIG. 1.

FIG. 17 illustrates a stabilizing cable arrangement for the lifting hoists of the breakdown station of FIG. 1.

DETAILED DESCRIPTION OF A PREFERRED EMBODIMENT

Figure 1:
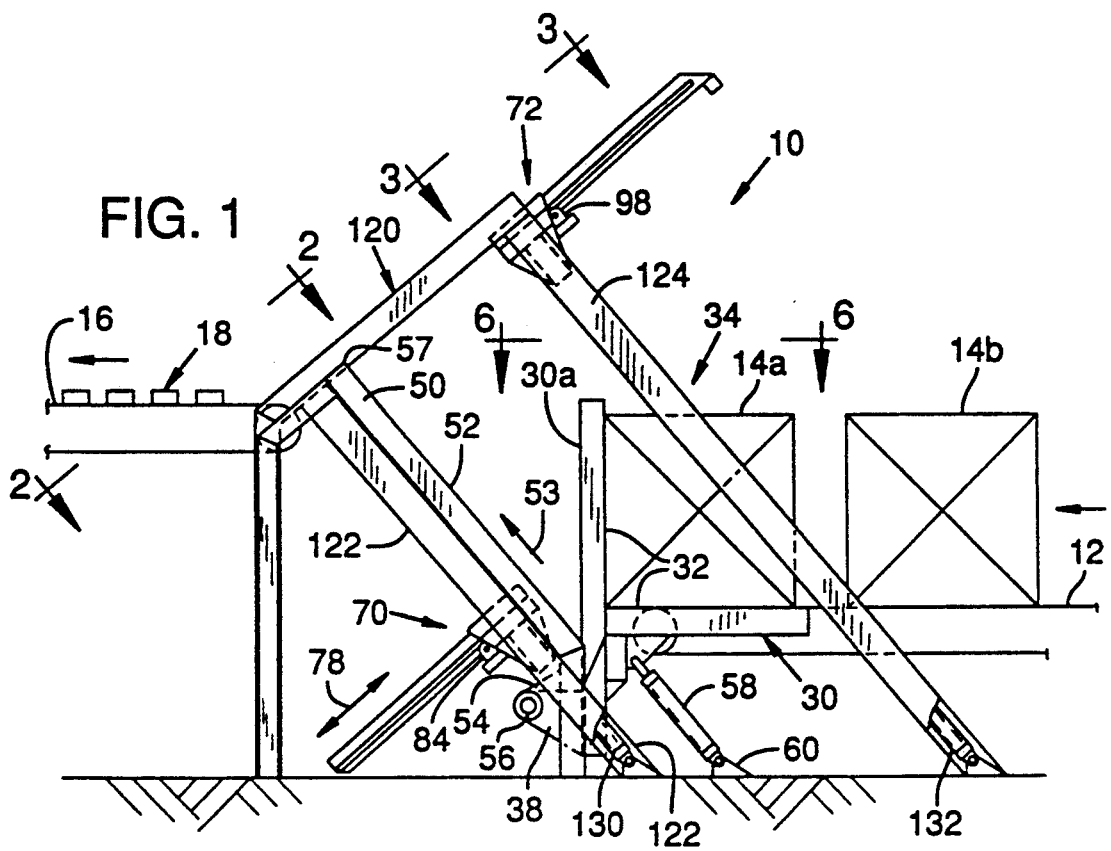
FIG. 1 is a side view of a breakdown station according to a preferred embodiment of the present invention.

In accordance with a preferred embodiment of the present invention, a dual independent hoist breakdown station 10 receives along an input conveyor 12 a series of loads 14, individually 14a, 14b . . . , for breakdown. Loads 14 are tiered packages of lumber pieces 18. Station 10 accomplishes breakdown by delivering upon the output conveyor 16 individual lumber pieces 18.

Station 10 receives loads 14 on a tilting frame 30, shown separately in FIGS. 6 and 7, including a set of L-shaped members 32 defining a two-sided load receiving space 34 for accepting loads 14 at the output of conveyor 12. More particularly, to receive a load 14 the frame 30 pivots to its upright position 30a, as shown in FIG. 1, and conveyor 12 brings the load 14 into space 34 above the horizontal portion of members 32 and against the vertical portion of members 32. Accordingly, conveyor 12 should controllably advance each load 14 into the load receiving space 34, i.e., move a load 14 into space 34 only when frame 30 has been pivoted to its upright position 30a with no preceding load 14 in space 34. Tilting frame 30 includes a horizontal main support member 36 (FIG. 6) with a pair of pivot brackets 38 at each end.

Station 10 further includes a set of inner frames 50 each defining a ramp 52 with all ramps 52 being co-planar. Ramps 52 define a transport path 53, i.e., parallel to ramps 52, directed toward a discharge point 57. As a load 14 moves along path 53 the top tier falls from station 10 at point 57 as individual pieces 18 onto conveyor 16. Loads 14 rest against ramps 52 as they move along path 53. It is suggested that ramps 52 low friction surface material, such as ultra high molecular weight polyethylene (UHMW). Of the inner frames 50, two include pivot brackets 54 for pivotally coupling by pins 55 to the brackets 38 of tilting frame 30. The tilting frame 30 thereby pivots about the axis 56 of pins 55. Hydraulic cylinder 58 couples tilting frame 30 and a fixed point 60 whereby cylinder 58 dictates positioning of tilting frame 30 about the axis 56.

After frame 30 receives a load 14, the load 14a as shown in FIG. 1, cylinder 58 pivots the frame 30 counter clockwise, in the view of FIG. 1, and frame 30 takes the weight of load 14a as it pivots toward its full tilt position 30b (see for example FIGS. 9-11) to deliver the load 14a against ramps 52 and into the path 53. In such position, i.e., as delivered at the beginning of path 53 by the tilting frame 30, one of two independently operable lifting hoists 70 and 72 moves load 14a along the transport path 53 and past the discharge point 57. As explained more fully hereafter, either one of hoists 70 and 72 independently, or both of hoists 70 and 72 in cooperation, accomplish the task of load 14 transport from the tilting frame 30 to and past the fixed discharge point 57.

Figure 2:
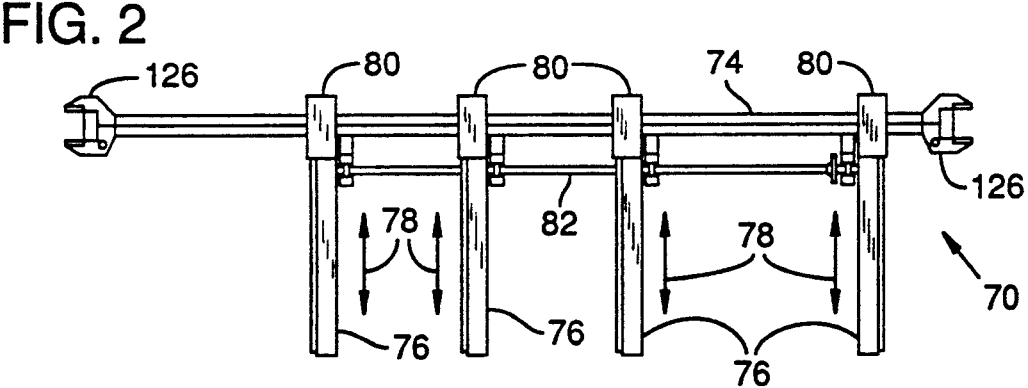
FIGS. 2 and 3 show independently operable package lifting hoists of the breakdown station of FIG. 1 taken generally along lines 2—2 and 3—3, respectively, of FIG. 1.

The lifting hoist 70, shown separately in FIG. 2, includes a support member 74 and a set of retractable load engaging forks 76. As used herein, the term "retractable" shall refer to an ability to move into and out of transfer path 53. In the illustrated embodiment, the forks 76 of hoist 70 move along their respective longitudinal axes as indicated generally at reference numerals 78. To this end, each fork 76 mounts slidably within a corresponding support housing 80 carried upon support member 74. The function of housings 80 is to transfer the moment of forks 76 to the support member 74 and to allow fork 76 extension into and retraction from the transfer path 53. Each of forks 76 carry a rack gear (not shown). The rack gears of the forks 76 mesh with corresponding pinion gears (not shown) carried upon a common drive shaft 82. A bi-directional hydraulic motor 84 operates drive shaft 82. Thus, controlled actuation of drive motor 84 accomplishes coordinated movement of the forks 76 into and out of the transfer path 53.

Figure 3:
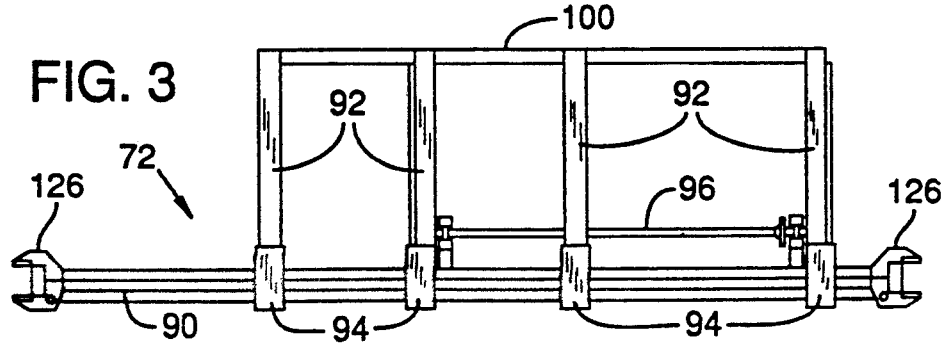

The lifting hoist 72, shown separately in FIG. 3, operates in substantially the same manner. Lifting hoist 72 includes a support member 90 and retractable forks 92. Each of forks 92 rest slidably within a support housing 94 similar to housing 80 of lifting hoist 70. In the case of lifting hoist 72, however, only two forks 92 carry rack gears (not shown) and a drive shaft 96 carries two corresponding pinion gears (not shown). A tie bar 100 couples the distal ends of all forks 92 for coordinated movement. A bi-directional hydraulic motor 98 moves drive shaft 96 to move all forks 92 into and out of transport path 53.

A pair of outer support frames 120, one illustrated separately in FIG. 5, slidably supports the lifting hoists 70 and 72. Each frame 120 includes a first support beam 122 co-planar with the ramps 52 and a second support beam 124 in parallel spaced relation to the ramps 52. The lifting hoist 70 slides along the beams 122 of both frames 120 and the lifting hoist 72 slides along the beams 124 of both frames 120. The support member 74 of hoist 70 includes at each end sliding mounts 126, each adapted for slidably engaging respective support beams 122. In addition to slidably mounting the support member 74, mounts 126 transfer the moment of forks 76 to beams 122 and thereby maintain forks 76 and ramps 52 in perpendicular relationship. The support member 90 of lifting hoist 72 includes similar slide mounts 126, each for slidably mounting the support member 90 on the beams 124 while maintaining a perpendicular relationship between the forks 92 and the ramps 52. The mounts 126 may be implemented by use of UHMW material or by use of bearing mounted rollers. In the illustrated embodiment, UHMW material establishes a sliding relationship between hoists 70 and 72 and beams 122 and 124, respectively.

Returning to FIG. 1, lifting hoists 70 and 72 move along the corresponding beams 122 and 124 by way of hydraulic cylinders 130 and 132, respectively, shown partially in FIG. 1. The coupling of cylinders 130 and 132 to hoists 70 and 72, respectively, may take a variety of forms. A stabilizing cable, discussed below and illustrated in FIG. 17 is used in the illustrated embodiment. In any case, the main support members 74 and 90 remain horizontal and slide along the beams 122 and 124, respectively. Actuation of cylinder 130, therefore, corresponds to linear positioning of hoist 70 along beams 122. Similarly, cylinder 132 dictates linear positioning of hoist 72 along beams 124.

In basic operation of station 10, a load 14 is delivered into the load receiving space 34 of tilting frame 30 and then tilted onto ramps 52 by operation of cylinder 58. The load 14 is then taken from the tilting frame 30 and carried along the transfer path 53 by either lifting hoist 70 or by lifting hoist 72. It will be understood, therefore, that either of lifting hoists 70 or 72 may be employed separately to accomplish breakdown. In other words, a breakdown station could be constructed with only one of the hoists 70 and 72, and accomplish breakdown. In the preferred embodiment of the present invention, however, it is suggested that coordinated use of both lifting hoists 70 and 72 be employed to maximize outflow of lumber pieces 18.

When the top tier of the load 14 reaches the discharge point 57, the hoist, be it hoist 70 or hoist 72, begins indexing movement with each incremental change in position corresponding to the depth of one tier of lumber pieces 18. In this manner, each tier of load 14 slides off breakdown station 10 and onto output conveyor 16. Once a complete tier of the load 14 passes by discharge point 57, the hoist is again indexed to bring the next tier past the discharge point 57. Such controlled movement of the hoist 70 and the hoist 72 is provided by indexed operation of the cylinders 130 and 132, respectively. When the last tier of a load 14 passes by discharge point 57, such "indexed discharge" operation of the hoist is complete and the hoist may return to pickup another load 14.

In the illustrated embodiment, return movement of the hoist 72, i.e., back toward the tilting frame 30, cannot occur until the tilting frame 30 has moved to its full tilt position 30b. In other words, the tilting frame 30 and load 14 must be out of the plane of beams 124, i.e., no longer obstructing the path of hoist 72, to allow hoist 72 to return to tilting frame 30 and accept another load 14.

Lifting hoist 70 has no such sequencing restriction with respect to the position of tilting frame 30 because tilting frame 30 does not move through the path of lifting hoist 70.

Another sequencing restriction of the illustrated embodiment requires that the tilting frame 30 remain in its full tilt position 30b until the load 14 just delivered against ramps 52 and accepted by one of hoists 70 and 72 has traveled along transport path 53 sufficient distance to allow tilting frame 30 to return to its upright position 30a. Thus, return of frame 30 to position 30a must reference the position of both hoists 70 and 72.

In a single hoist use of breakdown station 10, the basic sequencing steps would include receiving a load 14 in the space 34 of tilting frame 30 as located in its upright position 30a, tilting the load 14 by movement of frame 30 to its full tilt position 30b with load 14 resting against ramps 52, extending the hoist forks behind the load 14, moving the load 14 along the transport path 53 until the top tier of the load 14 reaches discharge point 57, and performing an indexed discharge operation by movement of the hoist incrementally towards the discharge point 57 until all tiers of the load 14 nave been discharged. During such movement of the load 14 toward and past the discharge point 57, the tilting frame 30 would return to its upright position 30a as soon as the load 14 and lifting hoist had cleared the return path for frame 30. While the hoist completes the indexed discharge operation, the tilting frame 30 receives the next load 14 and tilts back to position 30b to deliver the next load 14 against ramps 52. When the hoist completes the indexed discharge operation, it retracts its forks from the transfer path 53, returns to the tilting frame 30, extends its forks behind the load 14, and begins movement of the load 14 along the transfer path 53.

Figure 8:
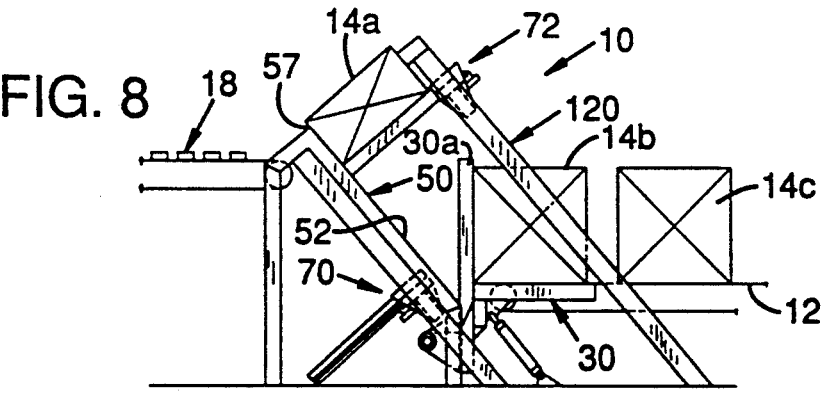
FIGS. 8-15 illustrate sequencing steps in dual hoist use of the breakdown station of FIG. 1.

FIGS. 8-15 illustrate a dual hoist use of breakdown station 10. In FIG. 8, hoist 72 is in the process of indexed discharge of a load 14a onto output conveyor 16. Tilting frame 30 is in its upright position 30a and has just received the next load 14b from conveyor 12. Hoist 70 is in its return position with its forks retracted in preparation for accepting the load 14b from tilting frame 30.

Figure 9:
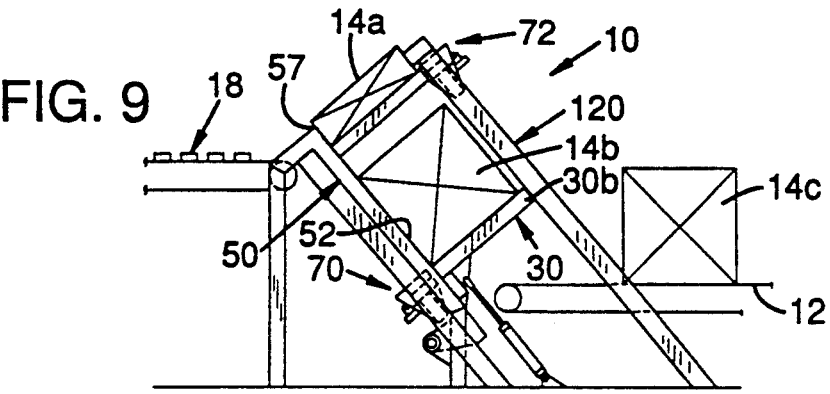

In FIG. 9, indexed discharge of load 14a by hoist 72 continues. Tilting frame 30 has pivoted load 14b into the transfer path 53 and against ramps 52. Also, hoist 70 has extended its forks behind the load 14b in preparation for transporting load 14b toward discharge point 57. As indexed discharge of load 14a continues by hoist 72, hoist 70 advances the load 14b along transfer path 53 until it approaches the preceding hoist 72. In this manner, the succeeding hoist "follows" the preceding hoist in order to minimize the distance between the top tier of a next load 14 and the discharge point 57 when the preceding hoist is clear to move the next load 14 to the discharge point 57.

Figure 10:
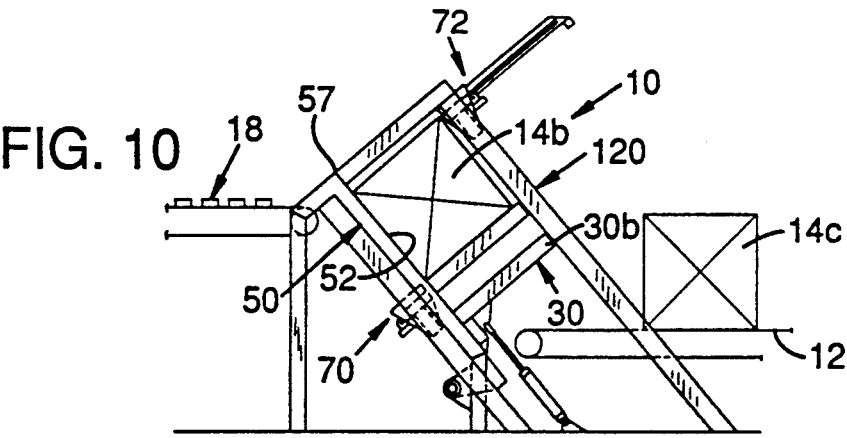
Figure 11:
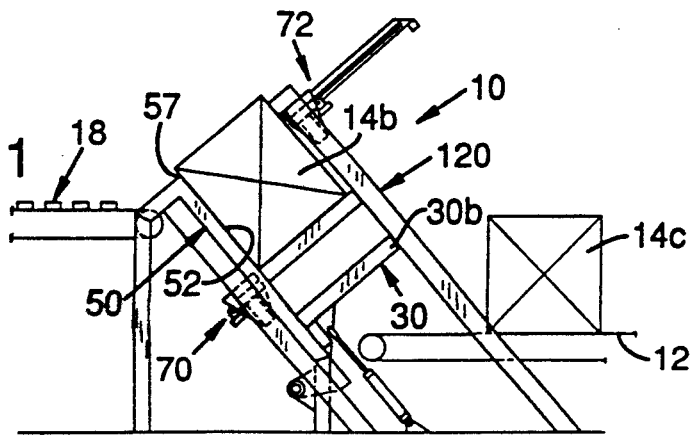

In FIG. 10, indexed discharge of load 14a is complete and hoist 72 has retracted its forks from the transfer path 53. Load 14b is now clear for movement to the discharge point 57 by hoist 70. As the top tier of load 14b reaches discharge point 57, indexed discharge of load 14b begins as shown in FIG. 11.

Figure 12:
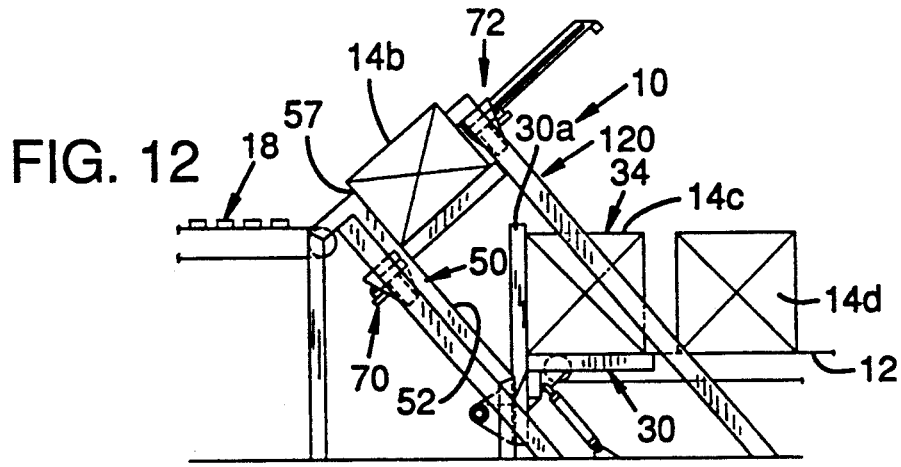
Figure 13:
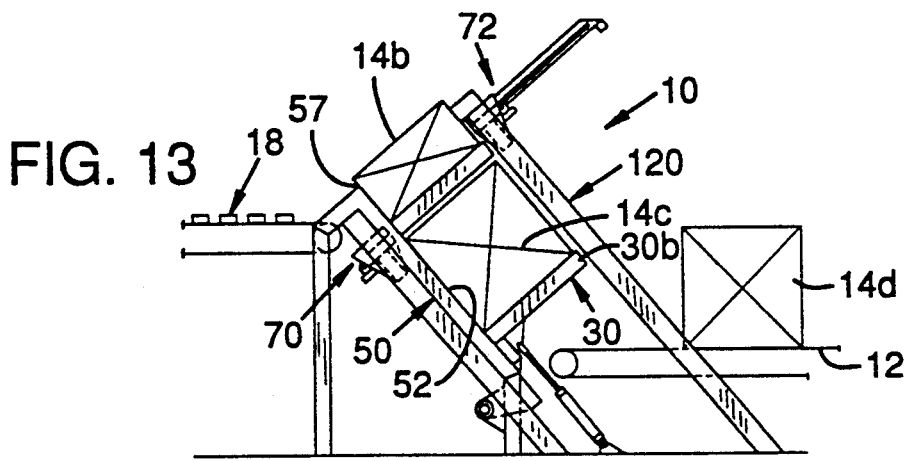

In FIG. 12, hoist 72 remains in its fully raised position while hoist 70 executes indexed discharge of load 14b. The hoist 72 must remain in its fully raised position, as shown in FIG. 12, until the tilting frame 30 has cleared the return path for hoist 72. Thus, tilting frame 30 returns to its upright position 30a and accepts the next load 14c in the load receiving space 34. In FIG. 13, tilting frame 30 then returns to its full tilt position 30b, carrying with it the load 14c.

Figure 14:
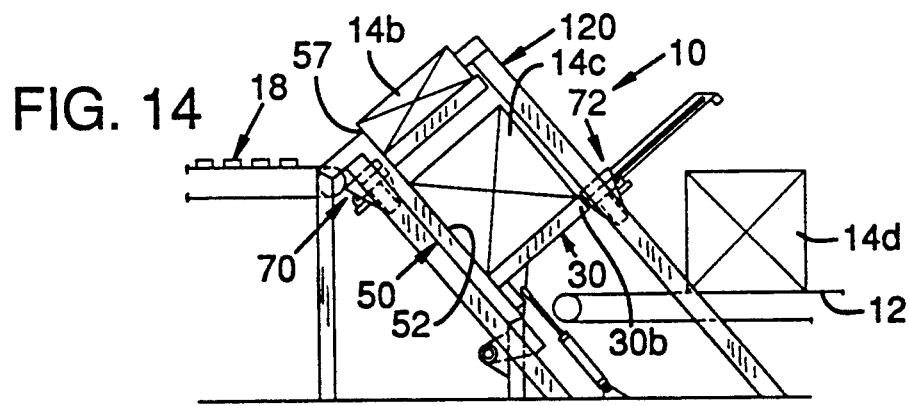

In FIG. 14, once load 14c has come to rest against ramps 52, the return travel path for hoist 72 is clear and hoist 72 returns to accept load 14c from tilting frame 30.

Figure 15:
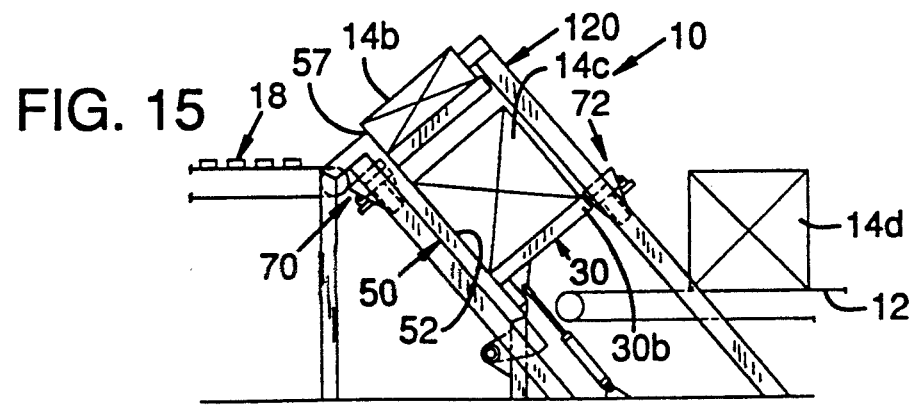

In FIG. 15, hoist 72 extends its forks behind the load 14c and then begins movement of the load 14c along the transport path 53 until the load 14c approaches the underside of hoist 70. At this point, hoist 72 simply "follows" the hoist 70 until indexed discharge of load 14b is complete and indexed discharge of load 14c can begin. During such time, the tilting frame 30 remains in its full tilt position 30b until the load 14c has advanced sufficiently along the transport path 53 to allow frame 30 to return to its upright position 30a and accept the next load 14d from conveyor 12.

FIG. 16 illustrates schematically the control arrangement for breakdown station 10. In FIG. 16, a programmable control 200 includes suitable hydraulic circuits and associated programmably controlled hydraulic values for controlled operation of the various hydraulic device of station 10 all according to known practice. The specific control arrangement may take a variety of forms, taking into account, as by for example limit switch inputs (not shown), the position of the lifting hoist, or hoists, used, the position of tilting frame 30, and the position of the top tier of lumber pieces 18 relative to discharge point 57. The forks of each hoist 70 and 72 can be selectively extended into or retracted from path 53 as well as selectively moved or indexed parallel to path 53. Tilting frame 30 may be moved selectively to its upright position 30a or to its full tilt position 30b. Input conveyor 12 is selectively incrementally advanced to introduce new loads 14 into breakdown station 10.

Control 200 operates conveyor 12 to advance a load 14 into the load receiving space 34 (FIG. 1) of tilting frame 30 when space 34 is empty and frame 30 is in its upright position 30a. Control 200 is provided with limit switch inputs representing the position of tilting frame 30, i.e., at upright position 30a or full tilt position 30b, and representing the presence or absence of a load 14 thereon. Given the proper state of these inputs, control 200 issues an advance load command 202 to conveyor 12 for moving a next load into space 34 and against the vertical portions of members 32.

Control 200 selectively moves tilting frame 30 from its upright position 30a to its full tilt position 30b to tilt a load 14 onto ramps 52. Control 200 receives limit switch inputs (not shown) representing the position of a load 14 far enough along transfer path 53 to allow return movement of tilting frame 30 to upright position 30a. Control 200 issues an up/tilt command 204 for selectively positioning tilting frame 30 at positions 30a and 30b, and may include additional limit switch inputs for indicating successful movement of frame 30 to positions 30a and 30b.

Control 200 may be programmed to operate either one or both of hoists 70 and 72. In manipulation of hoist 70, control 200 selectively moves hoist 70 along beams 122 according to a follow mode, an index discharge mode, and a return mode by way of a mode command 206. Also, control 200 extends and retracts forks 76 of hoist 70 by way of an in/out command 208. In the follow mode, hoist 70 is advanced toward and maintained just behind the preceding load 14 as carried on hoist 72. As may be appreciated, if station 10 is operating only hoist 70, the follow mode is not needed. In the indexed discharge mode, hoist 70 is advanced to where the top tier passes the discharge point 57 and falls from station 10; thereafter, hoist 70 moves incrementally according to the depth and number of the tiers of the load 14 until all tiers of the load 14 have been discharged. In the return mode, hoist 70 is lowered along beams 122 until reaching its return or pickup position at tilting frame 30.

Manipulation of hoist 72 is similarly accomplished by control 200 via a mode command 210 and an in/out command 212. More particularly, mode command 210 invokes a follow mode, an index discharge mode, or a return mode for hoist 72. Each of these modes correspond to that of hoist 70, except that the return mode for hoist 72 must take into account the position of tilting frame 30 and hold off return movement of hoist 72 toward tilting frame 30 until frame 30 has cleared the return path of hoist 72.

FIG. 17 illustrates a stabilizing arrangement for maintaining horizontal the main support member 90 of hoist 72. In FIG. 17, the coupling mounts 126 secure the member 90 upon the beams 124 of outer frames 120. As previously described, this mounting arrangement of member 90 allows free sliding movement of member 90 along beams 124 while transferring the moment of forks 92 to beams 124. A stabilizing cable 300 fixedly attaches to stationary point 302. From point 302 the cable 300 runs parallel to the cylinder 132 and passes over a pulley or sheave 304 rotatably mounted upon member 90. Cable 300 then runs along the length of member 90 until wrapping under a second sheave 306 also rotatably mounted upon the member 90. From sheave 306 cable 300 extends upward to an adjustable attachment point 308. Attachment of cable 300 is adjusted at the point 308 to establish a horizontal orientation for the member 90. In such configuration, a single hydraulic cylinder, i.e., cylinder 132, may be used to engage member 90 and thereby move the hoist 72 along the beams 124 while maintaining horizontal the main support member 90. A stabilizing cable arrangement may also be employed in the hoist 70 to maintain horizontal the member 74 of hoist 70.

Thus a dual independent hoist breakdown station has been shown and described. The breakdown station of the present invention provides a tilting frame which moves a load into a transfer path and at least one hoist having retractable forks for accepting a load from the tilting frame and moving the load toward and past a discharge point in order to accomplish breakdown. In the preferred embodiment of the present invention, a breakdown station uses two such lifting hoists operated in coordination to provide substantially continuous single piece output from the breakdown station. Accordingly, it may be appreciated that the breakdown station of the present invention, when provided with two independent hoist assemblies, may continue operation even in the case of failure for one of the hoist arrangements. The breakdown station of the present invention separates completely the functions of load tiltback and load transport to allow load tilting while discharging a preceding load.

It will be appreciated that the present invention is not restricted to the particular embodiment that has been described and illustrated and that variations may be made therein without departing from the scope of the invention as found in the appended claims and equivalents thereof. For example, while the preferred embodiment of the present invention as illustrated herein shows movement of a load along an inclined transport path, it should be understood that the present invention may be applied to a vertical transport path in combination with a raking mechanism for pulling tiers off the upper most layer of the load. Also, while the preferred embodiment of the present invention shows two hoist mechanisms on opposite sides of the load, it may be appreciated that other hoist configurations, including those with hoists positioned on the same side of the load, may be employed in practice of the present invention.

What is claimed is:

1. A breakdown apparatus comprising:
    ramp structure defining a load transport path;
    a tilting frame defining a load receiving space and capable of pivoting motion only about a fixed pivot point whereby a load in said receiving space is pivoted against said ramp structure said pivoting motion further placing a load into a start transport space of said transport path; and
    a lifting hoist with load engaging forks movable into and out of said load transport path and movable along said load transport path to accept a load from said tilting frame at said start transport space and to advance a load along said transport path to a fixed discharge point.

2. A breakdown apparatus according to claim 1 wherein said ramp structure defines an inclined ramp and carries at least some of the weight of a load as the lifting hoist moves the load along the transport path.

3. A breakdown apparatus according to claim 1 further comprising a control for sequencing breakdown steps including advancing a load into said receiving space when said tilting frame is in an upright position, tilting said frame from its upright position to a full tilt position to pivot said load against said ramp structure, extending said forks behind said load relative to said discharge point, moving said lifting hoist along said transport path toward said discharge point to begin and fully complete breakdown of said load at said discharge point, and returning said tilting frame to its upright position during breakdown of said load in preparation for receiving a next load during breakdown of a preceding load.

4. A breakdown apparatus according to claim 3 wherein said control stalls return of said tilting frame to its upright position until said load has advanced a given distance along said transport path.

5. A breakdown apparatus according to claim 1 wherein said breakdown apparatus further includes a second lifting hoist with load engaging forks movable into and out of said load transport path to accept a load from said tilting frame and transport a load along said load transport path, both first mentioned lifting hoist and said second lifting hoist being independently operable to accomplish breakdown by advancing a load fully along said transport path.

6. A breakdown apparatus according to claim 5 wherein said apparatus further includes a control for alternately actuating said hoists to accomplish breakdown of successive loads.

7. A breakdown apparatus comprising:
a fixed ramp structure defining a fixed discharge point at a first end of said ramp structure and defining a load transport path beginning at a second end of said ramp structure and progressing toward said fixed discharge point;
a tilting frame defining a load receiving space and pivotable about a fixed pivot point whereby a load in said load receiving space may be pivoted against said ramp structure at the beginning of said load transport path; and
first and second lifting hoists, each hoist including forks movable into and out of said transport path, each hoist being movable fully along said transport path to advance a load fully along said transport path to accomplish breakdown of a given load by accepting said given load from said tilting frame and moving said load past said discharge point.

8. A breakdown apparatus according to claim 7 further comprising a control for alternately actuating said hoists to accomplish breakdown of successive loads.

9. A breakdown apparatus comprising:
outer frames, each frame carrying upper and lower inclined beams, the upper beams being co-planar and the lower beams being co-planar;
inner frames lying intermediate of said outer frames and carrying inclined ramps defining at an upper end a fixed discharge point and therealong a load transport path beginning at a lower end of said ramps and extending to said discharge point;
a tilting frame pivoting about a fixed pivot point and receiving a load in a load receiving space thereof whereby said load may be pivoted against said ramps at the beginning of said transport path by pivoting of said tilting frame;
a first lifting hoist slidably mounted on the upper beams of said outer frames for movement parallel to said transport path, the first lifting hoist including load engaging forks movable into and out of said transport path; and
a second lifting hoist slidably mounted on the lower beams of said outer frames for movement parallel to said transport path, the second lifting hoist including load engaging forks movable into and out of said transport path.

* * * * *